(12) United States Patent
Aoki et al.

(10) Patent No.: US 11,954,328 B2
(45) Date of Patent: Apr. 9, 2024

(54) STORAGE MANAGEMENT DEVICE, STORAGE MANAGEMENT METHOD, AND PROGRAM

(71) Applicant: SONY INTERACTIVE ENTERTAINMENT INC., Tokyo (JP)

(72) Inventors: Keiichi Aoki, Tokyo (JP); Masaki Takahashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 95 days.

(21) Appl. No.: 17/626,621

(22) PCT Filed: Jul. 20, 2020

(86) PCT No.: PCT/JP2020/028131
§ 371 (c)(1),
(2) Date: Jan. 12, 2022

(87) PCT Pub. No.: WO2021/015174
PCT Pub. Date: Jan. 28, 2021

(65) Prior Publication Data
US 2022/0365677 A1 Nov. 17, 2022

(30) Foreign Application Priority Data
Jul. 25, 2019 (JP) ................................. 2019-137008

(51) Int. Cl.
*G06F 3/06* (2006.01)
(52) U.S. Cl.
CPC ............ *G06F 3/0604* (2013.01); *G06F 3/064* (2013.01); *G06F 3/0679* (2013.01)

(58) Field of Classification Search
CPC ...... G06F 3/0604; G06F 3/064; G06F 3/0679; G06F 2212/1024; G06F 2212/7205; G06F 3/0608; G06F 3/0652; G06F 12/0246
See application file for complete search history.

(56) References Cited

U.S. PATENT DOCUMENTS

| 7,930,273 B1* | 4/2011 | Clark ........................ G06F 8/71 717/170 |
| 2002/0083326 A1* | 6/2002 | Shimada ............ G11B 20/0021 713/182 |

(Continued)

FOREIGN PATENT DOCUMENTS

| JP | 2002202913 A | 7/2002 |
| JP | 2008530708 A | 8/2008 |
| JP | 2017021805 A | 1/2017 |

OTHER PUBLICATIONS

International Search Report and Written Opinion dated Oct. 27, 2020, from PCT/JP2020/028131, 9 sheets.

*Primary Examiner* — Francisco A Grullon
(74) *Attorney, Agent, or Firm* — XSENSUS LLP

(57) ABSTRACT

A processing load is reduced when a flash memory is used. A storage management device acquires an archive associated with an application, stores the acquired archive to one or more blocks among a plurality of blocks contained in the flash memory, and deletes one block among the plurality of blocks. In the archive storage, the acquired archive is stored in one of the blocks not storing an archive associated with an application different from that of the acquired archive, and in the deletion of one block, when an application is deleted, a block storing an archive associated with the application to be deleted is deleted.

15 Claims, 9 Drawing Sheets

(56) References Cited

U.S. PATENT DOCUMENTS

| | | | |
|---|---|---|---|
| 2006/0184719 A1* | 8/2006 | Sinclair | G06F 3/0607 711/E12.008 |
| 2014/0025641 A1* | 1/2014 | Kumarasamy | G06F 16/2365 707/661 |
| 2017/0017663 A1* | 1/2017 | Huo | G06F 16/1727 |

* cited by examiner

| Archive | Application ID | Type | Version | Size |
|---|---|---|---|---|
| app.pkg | APP1 | PACKAGE | 1.0.0 | 1200MB |
| 2app.pkg | APP2 | PACKAGE | 1.0.0 | 1300MB |
| patch101.pkg | APP1 | MODIFICATION PACKAGE | 1.0.1 | 800MB |
| AC1.pkg | APP1 | ADDITIONAL CONTENT | 1.0 | 400MB |
| AC2.pkg | APP1 | ADDITIONAL CONTENT | 1.0 | 300MB |
| 2patch101.pkg | APP2 | MODIFICATION PACKAGE | 1.0.1 | 100MB |
| patch102.pkg | APP1 | MODIFICATION PACKAGE | 1.0.2 | 900MB |

STORAGE MANAGEMENT DEVICE, STORAGE MANAGEMENT METHOD, AND PROGRAM

TECHNICAL FIELD

The present invention relates to a storage management device, a storage management method, and a program.

BACKGROUND ART

Flash memories are used as storage devices for computers such as game machines. Downloaded programs and content are stored in the flash memory.

SUMMARY

Technical Problems

The flash memory has a plurality of blocks of a certain size, and data is written in each block. Due to the characteristics of the flash memory, it is difficult to rewrite only a part of data in the block. Therefore, in a case where only a part of the data in the block is no longer needed, garbage collection is performed to copy only the necessary data to another block, and thereafter the entire original block is deleted (released).

Since this garbage collection involves the transfer of a large amount of data, the processing load is heavy, and there are cases where other processing such as data download is hindered.

The present invention has been made in view of the above problems, and an object of the present invention is to provide a technique for reducing a processing load when a flash memory is used.

Solution to Problems

In order to solve the above problems, a storage management device according to the present invention includes acquiring means that acquires an archive associated with an application, archive writing means that stores the acquired archive in one or more of a plurality of blocks included in a flash memory, and block deleting means that deletes any of the plurality of blocks. The archive writing means stores the acquired archive in any of the blocks in which no archive associated with an application different from the application of the acquired archive is stored, and, when an application is deleted, the block deleting means deletes a block in which an archive associated with the application to be deleted is stored.

Further, a storage management method according to the present invention includes the steps of acquiring an archive associated with an application, storing the acquired archive in one or more of a plurality of blocks included in a flash memory, and deleting any of the plurality of blocks. In the step of storing the archive, the acquired archive is stored in any of the blocks in which no archive associated with an application different from the application of the acquired archive is stored. In the step of deleting any of the plurality of blocks, when an application is deleted, a block in which an archive associated with the application to be deleted is stored is deleted.

Further, a program according to the present invention causes a computer to function as acquiring means that acquires an archive associated with an application, archive writing means that stores the acquired archive in one or more of a plurality of blocks included in a flash memory, and block deleting means that deletes any of the plurality of blocks. The archive writing means stores the acquired archive in any of the blocks in which no archive associated with an application different from the application of the acquired archive is stored. When an application is deleted, the block deleting means deletes a block in which an archive associated with the application to be deleted is stored.

According to the present invention, a processing load when the flash memory is used can be reduced.

In one aspect of the present invention, the block deleting means may delete the block by deleting all archives stored in any of the plurality of blocks.

In one aspect of the present invention, in a case where a size of the acquired archive is equal to or greater than a predetermined size, the archive writing means may store at least a part of the acquired archive in a block in which no other archive is stored.

In one aspect of the present invention, the archive belongs to either a first type or a second type, and the archive writing means may store a plurality of archives associated with a same application as the application of the acquired archive and belonging to the second type in a block in which only archives belonging to the second type are to be stored.

In one aspect of the present invention, in a case where the size of the acquired archive exceeds a size of the block, the archive writing means may divide the acquired archive into a plurality of parts, store at least some of the plurality of parts in one or more blocks in which no other archive is stored, and store some of the plurality of parts, which is not stored in the one or more blocks, in a block in which another archive is stored among the plurality of blocks. A size of the part of the archive to be stored in the block in which the another archive is stored may be smaller than the size of the block.

DESCRIPTION OF EMBODIMENTS

Hereinafter, embodiments of the present invention will be described with reference to the drawings. Among the components that appear, components having the same function are designated by the same reference signs, and the description thereof will be omitted.

In the present embodiment, an information processing device for storing an application program and image/audio content used in the application program in a flash memory will be described. The information processing device may receive the application program or the like via the network and store the received application program or the like in a flash memory. Alternatively, the information processing device may read an application program or the like stored in an information storage medium such as a Blu-ray disk and store the read application program or the like in the flash memory.

Figure 1:
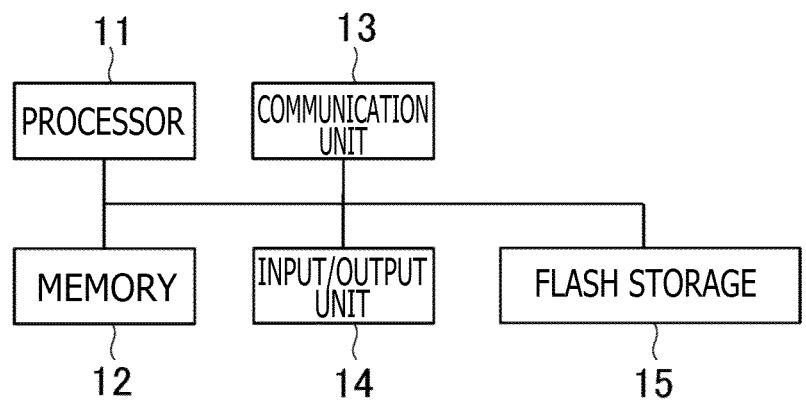
FIG. 1 is a diagram illustrating an example of a hardware configuration of an information processing device according to an embodiment of the present invention.

FIG. 1 is a diagram illustrating an example of a hardware configuration of an information processing device according to an embodiment of the present invention. The information processing device is a game machine, for example. The information processing device includes a processor 11, a memory 12, a communication unit 13, an input/output unit 14, and a flash storage 15.

The processor 11 operates according to the program stored in the memory 12 and controls the communication unit 13, the input/output unit 14, the flash storage 15, and the like. Note that the abovementioned program may be provided while being stored in a storage medium that can be read externally by a computer, or may be provided via a network such as the Internet.

The memory 12 includes a volatile memory element such as a DRAM (Dynamic Random Access Memory). The memory 12 stores a program to be executed among the abovementioned programs. Further, the memory 12 stores information and calculation results input from the processor 11, the communication unit 13, and the like. Note that the information processing device has an external storage device including the flash storage 15, in addition to the memory 12, and stores programs and information in the external storage device. Incidentally, a hard disk may be further included as the external storage device.

The communication unit 13 includes an integrated circuit, a connector, an antenna, and the like that constitute a wired LAN (Local Area Network) or a wireless LAN. The communication unit 13 has a function of communicating with another device via a network. Based on the control of the processor 11, the communication unit 13 inputs the information received from other devices into the processor 11 and the memory 12, and transmits the information to the other devices.

The input/output unit 14 includes a circuit that acquires an input from hardware that detects a user's operation, a display control circuit that outputs an image display signal to a display, a circuit that controls an external storage device such as an optical disk drive, and a circuit that outputs audio and the like. The input/output unit 14 acquires an input signal from an input device such as a keyboard or a controller and inputs the information obtained by converting the input signal to the processor 11 or the memory 12.

The flash storage 15 includes a flash memory element and a controller for the flash memory element.

Figure 2:
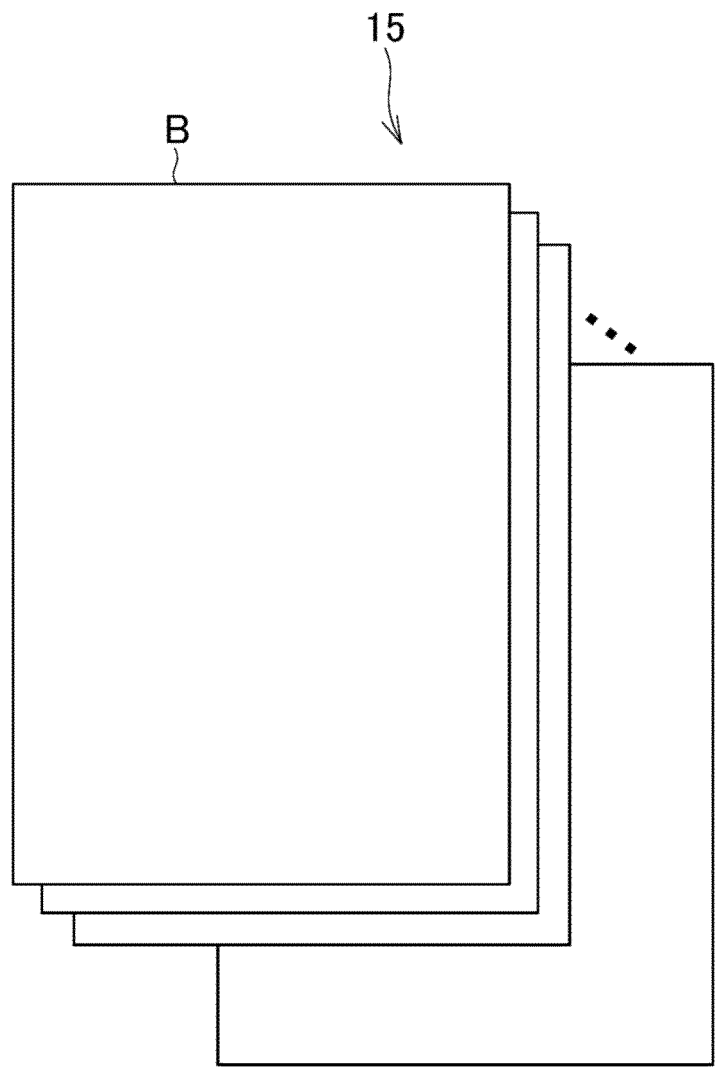
FIG. 2 is a diagram illustrating a configuration of a storage area of a flash storage.

FIG. 2 is a diagram illustrating a configuration of a storage area of the flash storage 15. The storage area of the flash storage 15 is divided into a plurality of blocks B. The storage area of each of the blocks B is several hundreds MB to several GB, for example. Under the control of the processor 11 that executes the operating system, the flash storage 15 sequentially writes the data set to each block B. Further, it is difficult to simply overwrite the data set recorded in each block B, and after deleting all the data stored in the block B including the data set, it becomes possible to newly store a new data set in the block B. Note that each of the blocks B included in the flash storage 15 includes a plurality of pages, and the data set is written to the flash memory element on a page-by-page basis on the hardware. Therefore, in view of the program running on the operating system, the data set is divided into one or more writing units according to the page size, and the divided one or more writing units are sequentially written in the storage area of the block B.

In the present embodiment, one or more blocks B are assigned to a logical partition L (also referred to as LPAR, see FIG. 7), and the information processing device sequentially writes a data set for each logical partition L and deletes data for each block B forming the logical partition L. Writing a data set to the logical partition L means writing the data set to any one of the blocks B constituting the logical partition L.

Figure 3:
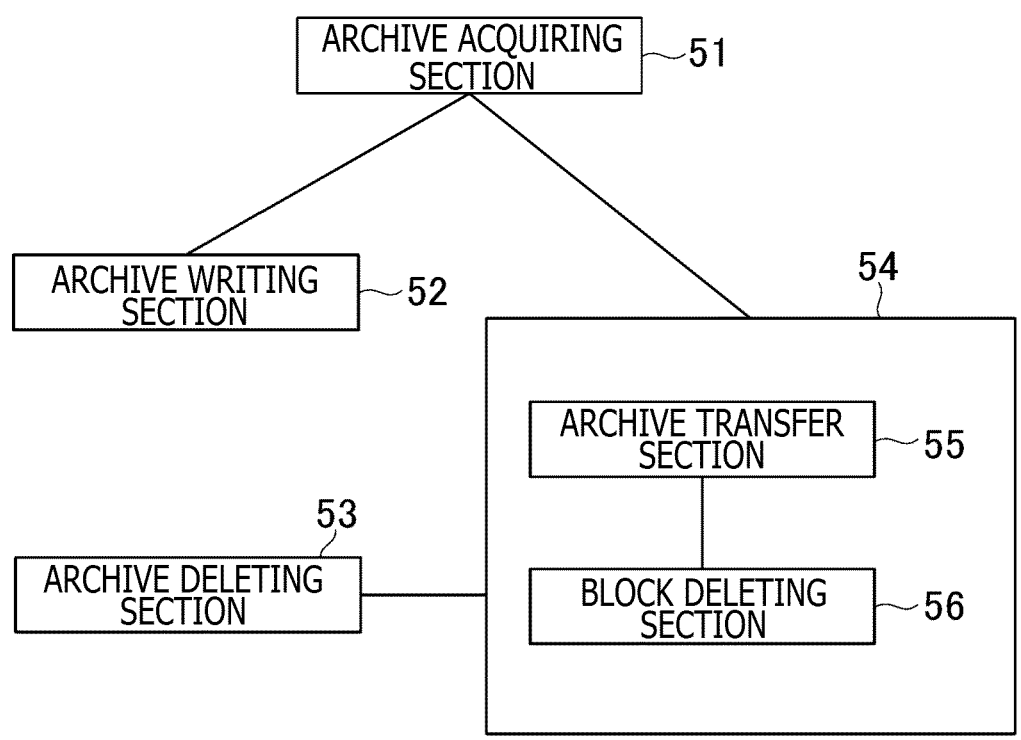
FIG. 3 is a block diagram illustrating a function achieved by the information processing device.

Next, the functions and processes achieved by the information processing device will be described. FIG. 3 is a block diagram illustrating a function achieved by the information processing device. The information processing device functionally includes an archive acquiring section 51, an archive writing section 52, an archive deleting section 53, and an area management section 54. Further, the area management section 54 functionally includes an archive transfer section 55 and a block deleting section 56. These functions are mainly implemented by the processor 11 executing a program stored in the memory 12 and controlling the communication unit 13, the input/output unit 14, and the flash storage 15.

The archive acquiring section 51 acquires an archive acquisition instruction by the user and acquires the archive for which an instruction is given by the acquisition instruction. The archive is associated with an application and belongs to any one of a plurality of predetermined types. At the time of acquiring the archive, the archive acquiring section 51 may receive the archive for which an instruction is given from the distribution server via the network, or may read the archive which is recorded in the external storage medium such as an optical disk and for which the instruction is given.

The archive writing section 52 stores the archive acquired by the archive acquiring section 51 in one or more of the plurality of blocks B included in the flash storage 15. Further, the archive writing section 52 stores the acquired archive in any of the blocks B in which no archive associated with an application different from that of the acquired archive is stored.

The archive deleting section 53 deletes the archive which is stored in the flash storage 15 and for which a deletion instruction is issued by the user, on the basis of the user's deletion instruction. Here, the archive deleting section 53 may delete the archive by storing a deletion flag of the archive for which a deletion instruction is issued by the user in the flash storage 15. Further, the archive deleting section 53 may cause the block deleting section 56 to delete all the data in the block B in a case where there is no other archive in the block B for which the deletion instruction is given.

The area management section 54 releases the area of the flash storage 15 that is not used due to deletion of the archive but is unwritable to secure a writable area by what is called garbage collection. Details of garbage collection will be described later.

The archive transfer section 55 included in the area management section 54 identifies the block B which is the transfer source for releasing a free area, and writes the archive included in the block B and not deleted into another block B. The block B of the transfer source stores an archive that is logically deleted and occupies the storage area in the block B, that is, an archive whose completion of deletion is indicated by the deletion flag.

The block deleting section 56 included in the area management section 54 deletes any of the plurality of blocks B. To be more specific, the block deleting section 56 deletes the block B in which only the archive to be deleted exists, or the block B of the transfer source after the archive has been transferred. Further, when the application is deleted, the block deleting section 56 deletes the block B in which the archive associated with the application to be deleted is stored. Incidentally, the block deleting section 56 deletes (releases) the block B by deleting all the archive entities stored in the block B which is the target.

Figure 4:
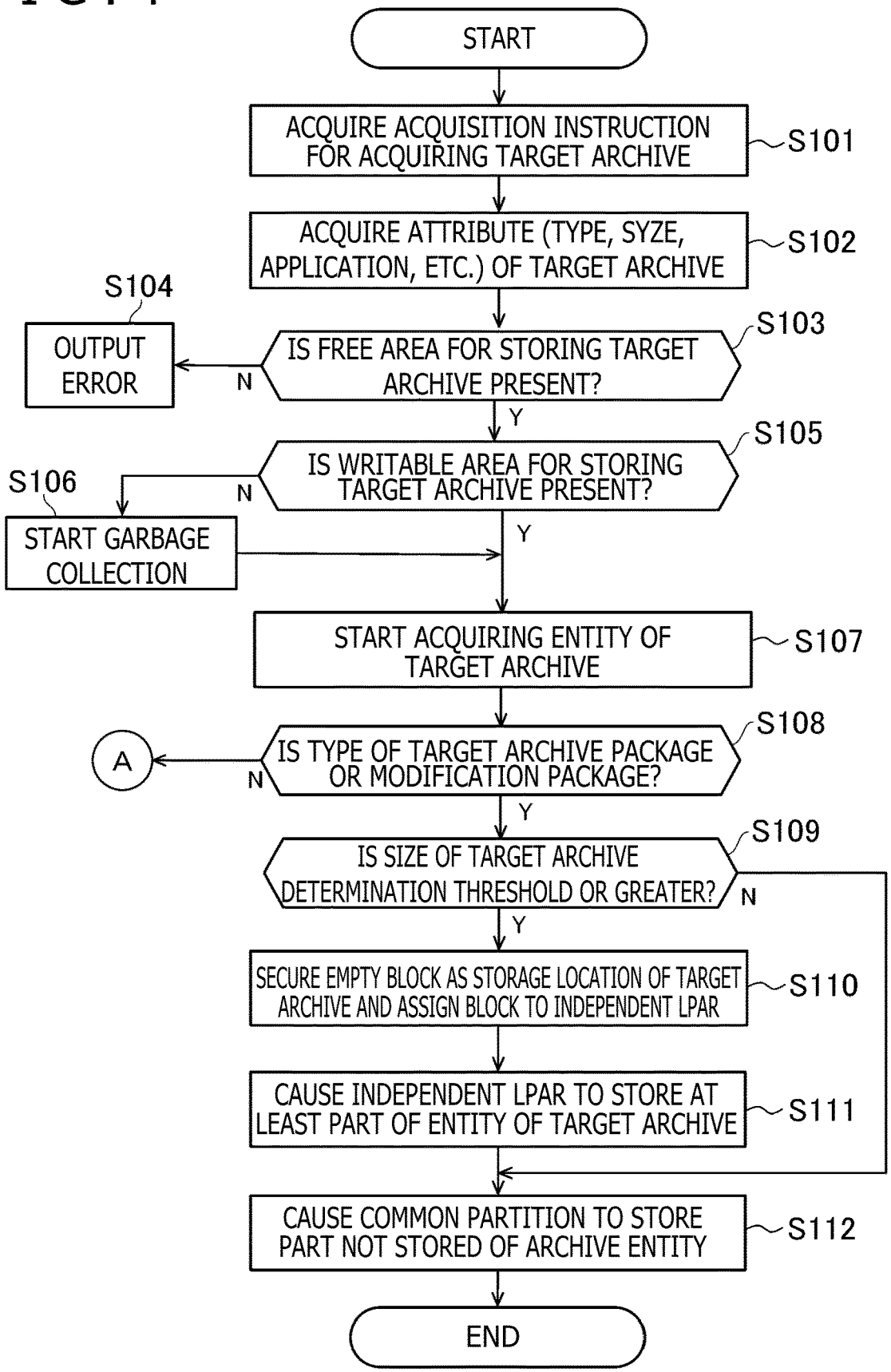
FIG. 4 is a flow chart illustrating an example of a process in which the information processing device acquires an archive from outside and stores the archive in the flash storage.
Figure 5:
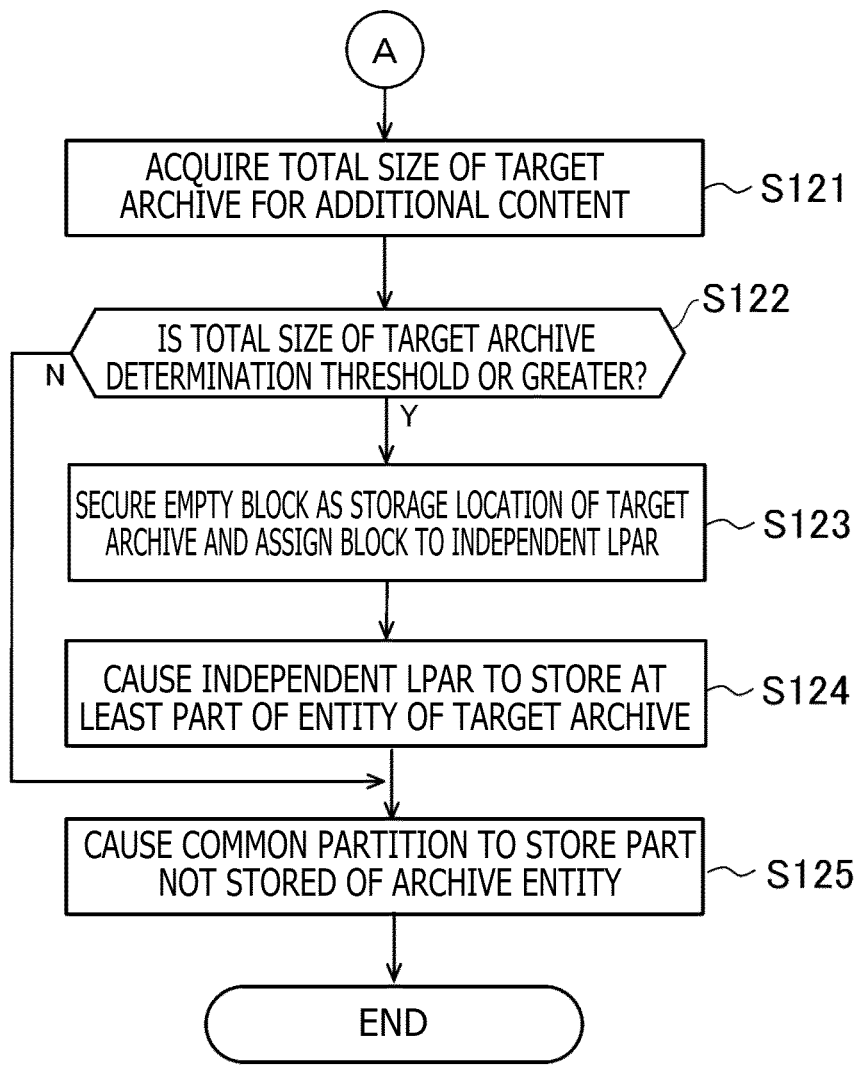
FIG. 5 is a flow chart illustrating an example of a process in which the information processing device acquires an archive from the outside and stores the archive in the flash storage.

Next, the process of acquiring an archive and storing the archive in the flash storage 15 will be described in more detail. FIGS. 4 and 5 are flow charts illustrating an example of a process in which the information processing device acquires an archive from the outside and stores the archive in the flash storage 15.

First, the archive acquiring section 51 acquires an acquisition instruction to acquire the target archive, from the user via the input/output unit 14, for example (step S101). The acquisition instruction is information that designates a target archive to be newly acquired and stored in the flash storage 15 by the information processing device among a plurality of archives existing in the server, for example. The acquisition instruction may be information that designates an archive to be newly acquired and stored in the flash storage 15 by the information processing device among one or more archives stored in an external storage medium such as an optical disk. Further, the acquisition instruction may target a plurality of archives, but here, it is assumed that the plurality of archives belong to the same application.

When the acquisition instruction is acquired, the archive acquiring section 51 acquires the attribute of the target archive (step S102). The archive attributes include the type of the archive, size of the archive, and application's identification information (ID).

Figures 6, 7:
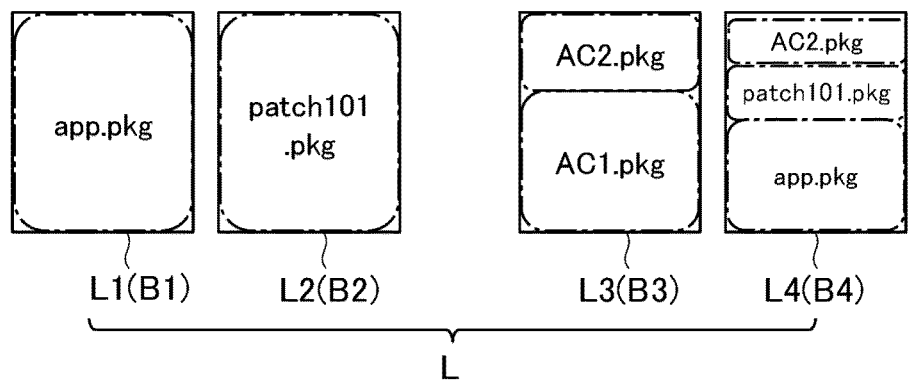
FIG. 6 is a diagram illustrating an example of attributes of the archive.
FIG. 7 is a diagram illustrating an example of the archives stored in logical partitions.

FIG. 6 is a diagram illustrating an example of archive attributes. As illustrated in FIG. 6, each row corresponds to an archive, and each column corresponds to an attribute. The item "Archive" is information for identifying the archive, and the item "Application ID" is information for identifying the application (for example, a game title) associated with the archive. The item "Type" is the type of the archive. The item Version indicates the version of the archive, and the item "Size" indicates the file size of the archive, in other words, the size of the occupied area in the case of an archive stored in the flash storage 15.

In the present embodiment, there are three types of archives "package," "modification package," and "additional content." The package contains the program of the application, and the data of the content such as video and audio that the program uses and outputs to the user. A modification package is an archive for upgrading a package and includes modification program (patch) and data of content related to modification. The additional content (AC) includes data of additional content that is not included in the package or modification package and is available in the application program. The additional content may be provided to the information processing device on the basis of a charge different from the package, for example.

It should be noted that, in a case where a plurality of archives are designated in step S101, the plurality of archives belong to the same application, and further all of the archives are additional content, processing may be performed thereafter while the plurality of archives are collectively regarded as one archive.

When the attributes of the target archive are acquired, the archive acquiring section 51 determines whether there is a free area in the flash storage 15 that can store the target archive (step S103). In a case where there is no free area (N in step S103), an error is output and the process ends (step S104). Here, the free area includes not only an area in which data is not written (hereinafter referred to as "writable area") in the flash storage 15, but also space occupied by an archive or a file which is logically deleted but is not physically deleted.

On the other hand, in a case where there is free area for storing the target archive (Y in step S103), the archive acquiring section 51 determines whether the flash storage 15 has a writable area that can store the target archive (Step S105). In a case where no writable area exists (N in step S105), the area management section 54 is caused to start the garbage collection process, and the processing transitions to the process in step S107 (step S106). In a case where there is a writable area (Y in step S105), the process in step S106 is skipped.

In step S107, the archive acquiring section 51 starts acquiring the entity of the target archive (step S107). Here, the archive acquiring section 51 may receive the archive entity via the communication unit 13 in a case where the target archive is in the server, or may read the archive entity via the input/output unit 14 in a case where the target archive is in the external storage medium.

When the reading of the archive entity is started, the archive writing section 52 determines whether the type of the target archive is a package or a modification package (step S108). In a case where the target archive type is not a package or a modification package, that is, the type is additional content (N in step S108), the processes after step S121 are executed.

On the other hand, in a case where the target archive type is a package or a modification package (Y in step S108), the archive writing section 52 determines whether or not the size of the target archive is equal to or greater than the determination threshold value (step S109). In a case where the size of the target archive is equal to or greater than the determination threshold value (Y in step S109), the archive writing section 52 secures an empty block B as a storage location of the target archive, and allocates the secured block B to an independent logical partition L (LPAR) (step S110). Further, the archive writing section 52 stores at least a part of the entity of the target archive in the independent logical partition L (step S111). As a result, at least a part of the target archive is stored in a block B in which no other archives are stored. On the other hand, in a case where the size of the target archive is smaller than the determination threshold value (N in step S109), steps S110 and S111 are skipped.

The determination threshold value is determined according to the size of area of the block B. For example, the determination threshold value may be the data size of area of the block B, or may be a value obtained by multiplying the data size of area of the block B by a predetermined value of 0.8 to 1 inclusive. In the case where the size of the target archive is equal to or greater than the determination threshold value, since there is no big problem even if the archive is stored alone in the block B, the archive writing section 52 assigns one or more blocks B that do not store another archive to the logical partition L, and stores at least a part of the archive in the block B assigned to the logical partition L in steps S110 and S111. In a case where the determination threshold value is the data size of area of the block B, the number of the blocks B secured by the archive writing section 52 is the number obtained by dividing the size of the archive by the size of the block B and rounding down decimal places. On the other hand, in a case where the determination threshold value is smaller than the size of the block B, the archive writing section 52 obtains the sum of the archive size and (the size of the block B—the determination threshold value), and secures blocks B, whose number is obtained by dividing the sum by the size of the block B and rounding down decimal places. Then, the archive writing section 52 stores as large a part of the archive as possible in the secured blocks B.

Then, the archive writing section 52 stores the part not stored of the archive entity in the common partition (step S112). Incidentally, in a case where there is no part of the archive entity not stored, the archive writing section 52 does not store the archive entity in the common partition.

By these processes, the archive writing section 52 executes the following three processes in a case where the size of the target archive exceeds the size of the block B. In the first process, the archive writing section 52 divides the target archive into a plurality of parts, and in the second process, the archive writing section 52 stores at least some of the plurality of parts in one or more blocks B where no other archive is stored, and then in the third process, the archive writing section 52 stores the some of the plurality of parts that is not stored in the one or more blocks B, in a block B of the common partition where another archive is stored. The size of the archive stored in one or more blocks B where no other archive is stored is greater than or equal to the determination threshold value. Also, the size of the archive stored in the block B of the common partition is smaller than the size of the block B.

The common partition is a logical partition L which is provided for each application and to which one or more blocks B are assigned. The common partition stores data of a plurality of archives for an application regardless of the types of archives. Data of a plurality of archives is also stored in each block B constituting the common partition. Incidentally, in a case where the writable area of the common partition is exhausted, the archive writing section 52 allocates a new block B to the common partition to expand the area, so that the archive can be stored.

In a case where it is determined in step S108 that the archive type is an additional content (N in step S108), the archive writing section 52 acquires the total size of the target archive for the additional content (step S121). In a case where the number of archives of the target additional content is one, the archive writing section 52 acquires the size of the archive as the total size.

In a case where the total size of the target archive is equal to or greater than the determination threshold value (Y in step S122), the archive writing section 52 secures an empty block B as a storage location of the target archive and assigns the secured block B to an independent logical partition L (step S123). Further, the archive writing section 52 stores at least a part of the entity of the target archive in the independent logical partition L (step S124). The processing of steps S123 and S124 is similar to that of steps S110 and S111, except that a plurality of archives are collectively stored in the independent logical partition L in a case where the number of the archives of the target additional content is two or more. On the other hand, in the case where the size of the target archive is smaller than the determination threshold value (N in step S122), steps S123 and S124 are skipped.

Then, the archive writing section 52 stores the part of the archive entity not stored in the common partition (step S125). Incidentally, in a case where there is no part that is not stored of the archive entity, the archive writing section 52 does not store the archive entity in the common partition.

FIG. 7 is a diagram illustrating an example of archives stored in the logical partitions L. FIG. 7 illustrates an example in which archives are acquired in the order of archives app.pkg, patch101.pkg, AC1.pkg, and AC2.pkg, and stored in the flash storage 15. The logical partitions L1, L2, L3, and L4 have blocks B1, B2, B3, and B4, respectively. Further, the package (app.pkg) and the modification package (patch101.pkg) are stored in independent logical partitions L1 and L2, respectively. Further, the data of a plurality of archives (AC1.pkg, AC2.pkg) is stored in the logical partition L3 for the additional content. The logical partition L4 is a common partition, and parts of the archives app.pkg, patch101.pkg, and AC2.pkg that cannot be stored in the logical partitions L1, L2, and L3 are stored therein. This archive arrangement reduces the loads of the garbage collection. The reason will be described later.

Figure 8:
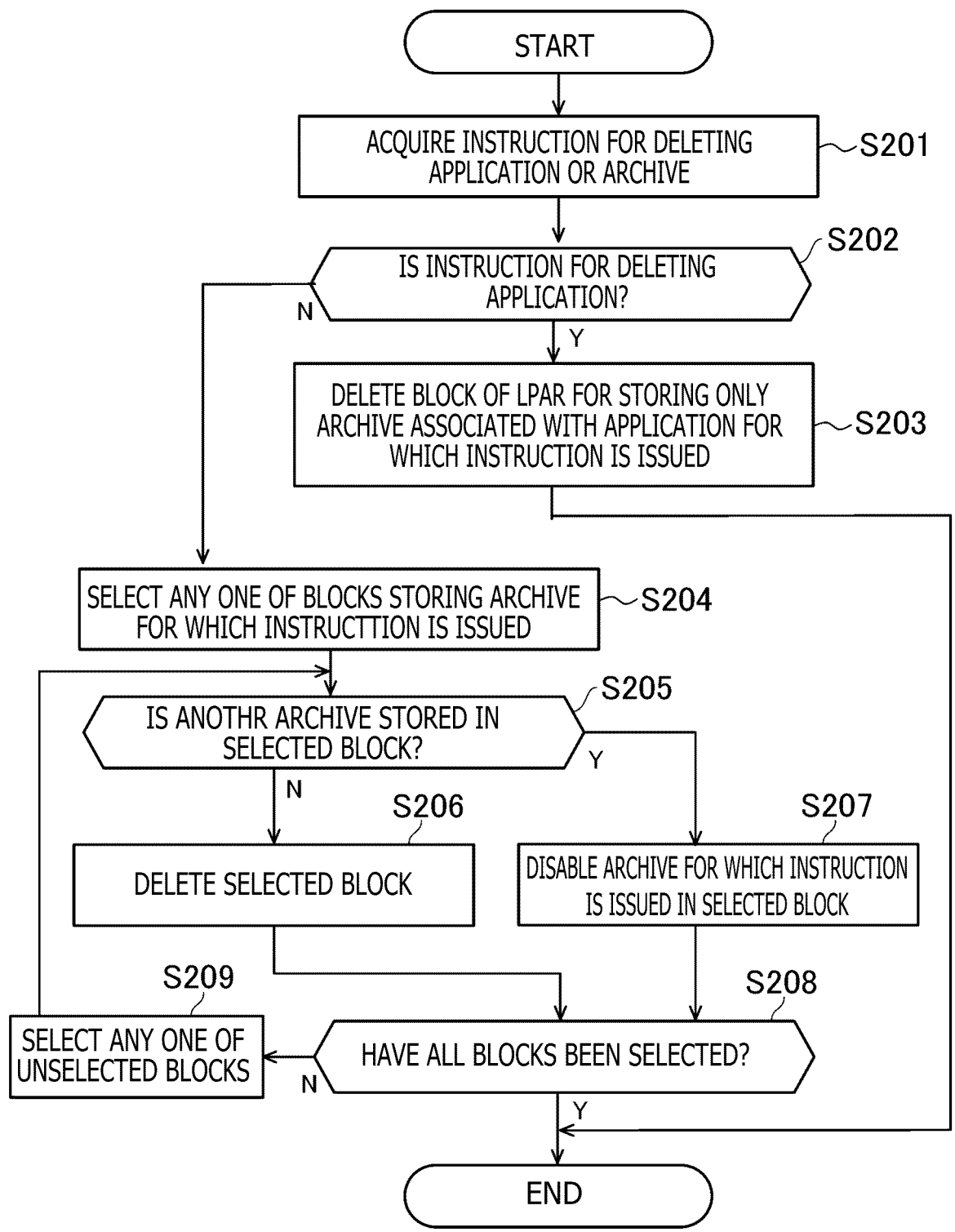
FIG. 8 is a flow chart illustrating an example of a process of deleting an archive or an application.

Next, the deletion of the archive by the archive deleting section 53 will be described. FIG. 8 is a flow chart illustrating an example of a process of deleting an archive or an application. First, the archive deleting section 53 acquires an instruction (deletion instruction) to delete any application or any archive stored in the flash storage 15 from the user via the input/output unit 14, for example (step S201).

In a case where the deletion instruction is an instruction to delete the application (Y in step S202), the archive deleting section 53 deletes the block B included in the logical partition L that stores only the archive associated with the application for which the instruction is issued (step S203). On the other hand, in the case of the deletion instruction to delete the archive (N in step S202), the archive deleting section 53 selects any one of the blocks B in which the archive for which the instruction is given is stored (step S204). Then, in a case where no other archive is stored in the selected block B (N in step S205), the archive deleting section 53 deletes the selected block B (step S206). In a case where another archive is stored (Y in step S205), a delete flag is set for the archive for which the instruction is given, in the selected block B to disable this archive (step S207). The reason why the archive entity is not deleted from the flash storage 15 is that it is necessary to delete the archive entity in the block B on a block-by-block basis, and only the archive entity cannot be deleted. Then, in a case where all the blocks B have been selected (Y in step S208), the processing is terminated, and in the case of not having been selected (N in step S208), an unselected block B is selected among the blocks B storing the archive for which the instruction is given (step S209), and step S205 and subsequent steps are repeated.

Figure 9:
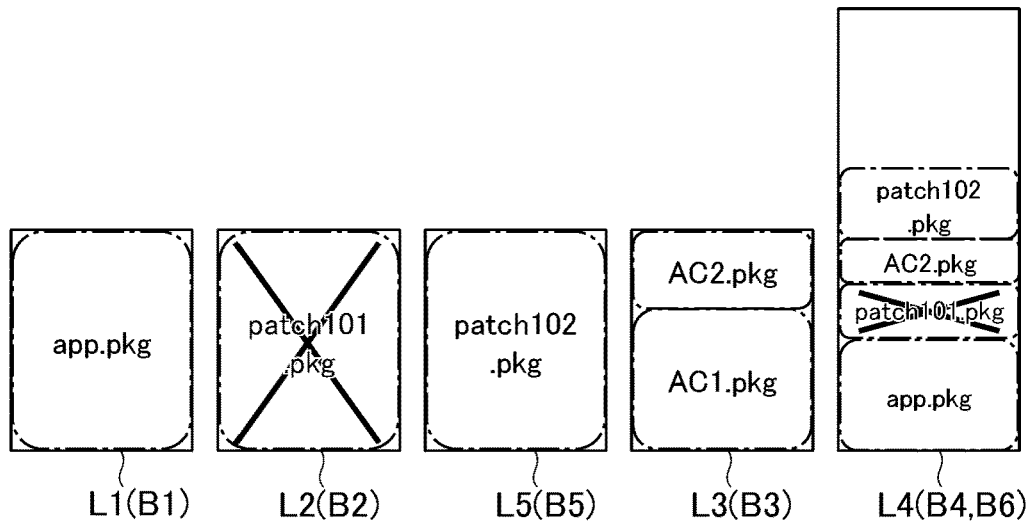
FIG. 9 is a diagram illustrating change of the logical partition when the archive is deleted.

FIG. 9 is a diagram illustrating a change of the logical partition L when the archive is deleted. FIG. 9 illustrates an example in which a new version of the modification package patch102.pkg is stored in the logical partition L5 (block B5) and the logical partition L4 (blocks B4 and B6) of the flash storage 15 after the state of FIG. 4, and thereby, the old version of the modification package patch101.pkg is eliminated. In this case, the logical partition L2 that stores only the entity of the modification package patch101.pkg and the block B2 that constitutes the logical partition L2 are deleted, and further the entity of the modification package patch101.pkg stored in the common partition becomes unusable.

Figure 10:
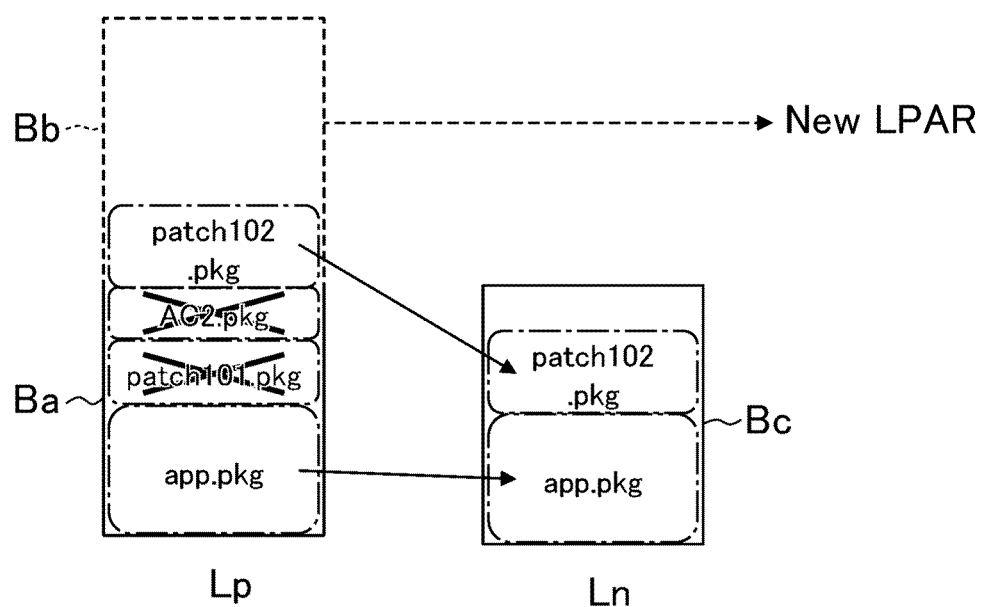
FIG. 10 is a diagram illustrating a method of garbage collection.

Next, the garbage collection by the area management section 54 will be described. FIG. 10 is a diagram illustrating a garbage collection method. In the example of FIG. 10, the original logical partition Lp has two blocks Ba and Bb. The logical partition Ln after garbage collection has one block Bc, and stores the archive stored in the logical partition Lp without being deleted. In the present embodiment, the garbage collection is a process of the archive transfer section 55 copying the archive stored in a plurality of blocks B (Ba and Bb in FIG. 10) in order to store the archive in a smaller number of blocks B (Bc in FIG. 10), and also of the block deleting section 56 releasing the copy source block B (Ba and Bb in FIG. 10). As a result, the released block B becomes cable of being allocated to another logical partition L.

Figure 11:
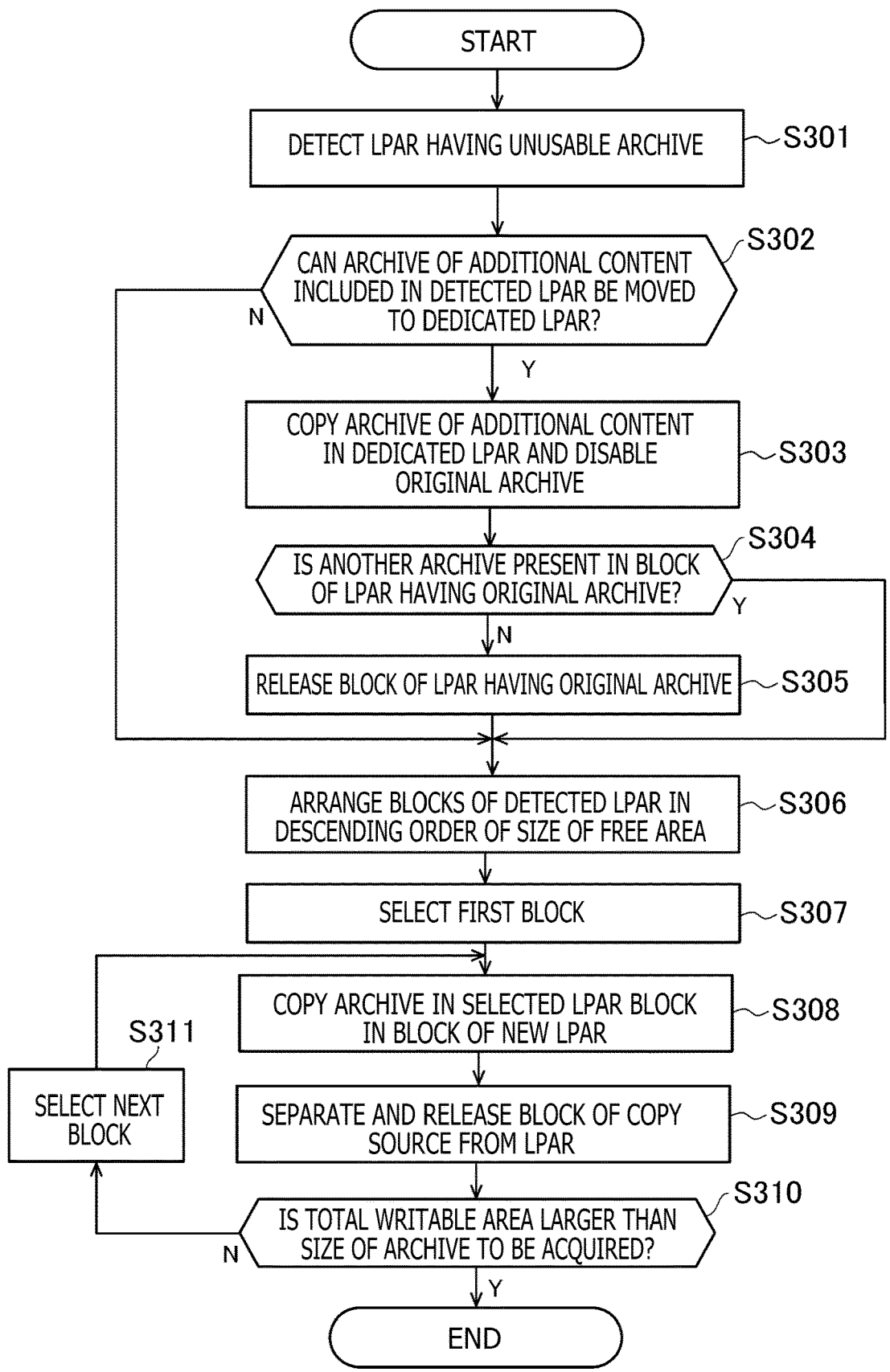
FIG. 11 is a flow chart illustrating an example of processing of the garbage collection.

FIG. 11 is a flow chart illustrating an example of garbage collection processing. First, the archive transfer section 55 included in the area management section 54 detects the logical partition L having the unusable archive (step S301). Next, the archive transfer section 55 determines whether the archive of the additional content included in the detected logical partition L can be moved to a logical partition L dedicated to the additional content (step S302). For example, the archive transfer section 55 may determine that the archive is movable in a case where the total size of the additional content of the specific application included in the detected logical partition L exceeds a determination threshold value.

In a case where it is determined that the additional content can be moved to the dedicated logical partition L (Y in step S302), the archive transfer section 55 copies the archive of the additional content into the dedicated logical partition L and disables the original archive. (step S303). Then, in a case where there is no other archive in the block B of the logical partition L having the original archive (N in step S305), the block deleting section 56 deletes and releases the block B of the logical partition L (step S305). Note that, in a case where it is determined that the additional content cannot be moved to the dedicated logical partition L (N in step S302), the processes of steps S303 to S305 are skipped.

Then, the archive transfer section 55 arranges the blocks B of the detected logical partition L in descending order of the size of the free area (step S306), and selects the first block B (step S307). The archive transfer section 55 copies the archive in the selected logical partition L into the block B of a new logical partition L (step S308), and the block deleting section 56 separates the block B of the copy source from the logical partition L to release the block B (step S309). Then, in a case where the total writable area is larger than the size of the archive for which the acquisition instruction is given and the acquisition of the archive has been started (Y in step S310), the process is terminated. On the other hand, in the case different from the above (N in step S310), the next block B is selected (step S311), and the processing after step S308 is repeated.

Figure 12:
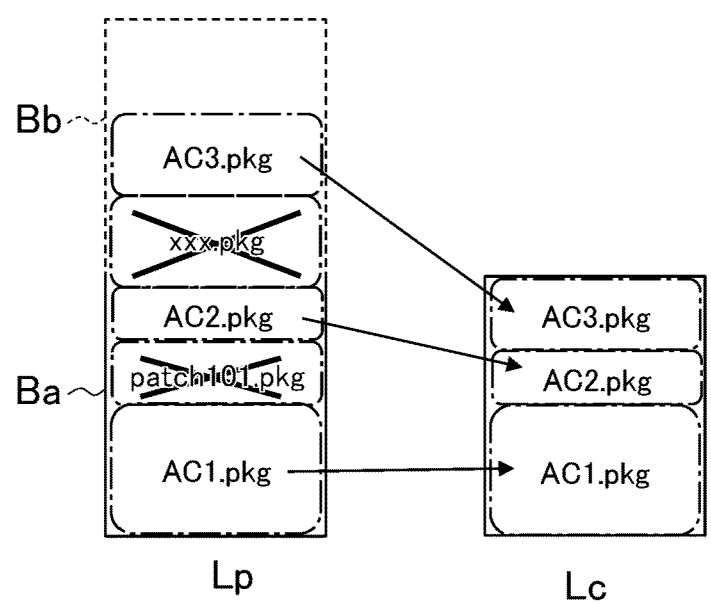
FIG. 12 is a diagram illustrating an example of the garbage collection.

FIG. 12 is a diagram illustrating an example of garbage collection and is an example in which a plurality of additional content stored in the logical partition Lp are transferred to the logical partition Lc dedicated to the additional content. By collecting additional content in a dedicated logical partition Lc, the load can be reduced when garbage collection is further performed in a case where it is unlikely that the additional content will be deleted, and the archive located on the common partition is deleted after garbage collection.

Here, the effect of storing the archive by the archive writing section 52 as illustrated in FIG. 7, for example, will be described. For each of the blocks B1 and B2 illustrated in FIG. 7, since only the part belonging to a single archive is stored, it is sufficient if the blocks B1 and B2 are deleted at the time of deletion of the archive, and thus garbage collection is unnecessary. Here, as for the modification package, there is a case where a plurality of versions of the modification package are supplied, and only the latest version of the modification package is stored in the flash storage 15, and thus the modification package of the earlier version is deleted. In such a case, the load of garbage collection can be reduced by deleting only the block B in which the modification package of the previous version exists. Further, the block B in which only the package is stored is not subjected to garbage collection due to the deletion of other archives. This makes it possible to reduce the amount of data transfer required for garbage collection and then to reduce the load.

Further, the logical partition L3 of the additional content stores archives of a plurality of additional content belonging to the same application, and the logical partition L4 which is a common partition also contains a part or all of the plurality of archives belonging to the same application. As a result, when deleting a certain application, it is only necessary to delete the blocks B3 and B4 that store the archive of this application. As a result, the number of the blocks B that can be released without garbage collection is increased, and the processing load of garbage collection can be reduced. Since it is unlikely that the additional content will be deleted as an archive alone, even in a case where the archive size of the additional content is not large, by storing the archive in the block B3 for the additional content and further storing a plurality of archives of the additional content in the same block B, the processing load of garbage collection can be reduced while ensuring the utilization efficiency of the storage.

That is, when the archive is stored in the flash storage 15, the transfer amount of copy processing in the garbage collection can be reduced by determining the block B to be used for storage in consideration of the application, the type of archive, and the like, and the processing load can be reduced.

The invention claimed is:

1. A storage management device comprising processing circuitry configured to:
   acquire an archive associated with a first application;
   store the acquired archive in one or more of a plurality of blocks included in a flash memory; and
   delete one or more of the plurality of blocks,
   wherein the processing circuitry is further configured to:
      store the acquired archive in one or more of the plurality of blocks that does not store any archive associated with an application different from the first application; and,
      when the first application is deleted, delete a block that stores an archive associated with the first application.

2. The storage management device according to claim 1, wherein the processing circuitry is further configured to delete the block by deleting all archives stored in any of the plurality of blocks associated with the first application.

3. The storage management device according to claim 1, wherein, when a size of the acquired archive is equal to or greater than a predetermined size, the processing circuitry is further configured to store at least a part of the acquired archive in a block in which no other archive is stored.

4. The storage management device according to claim 3, wherein the acquired archive belongs to either a first type or a second type, and
wherein the processing circuitry is further configured to store a plurality of archives associated with the first application and belonging to the second type in a block in which only archives belonging to the second type are to be stored.

5. The storage management device according to claim 3, wherein, when the size of the acquired archive exceeds a size of the block, the processing circuit is further configured to:
divide the acquired archive into a plurality of parts;
store at least some of the plurality of parts in a first set of one or more blocks in which no other archive is stored; and
store at least some of the plurality of parts, which is not stored in the first set of one or more blocks, in a block in which another archive is stored among the plurality of blocks, and
wherein a size of the part of the acquired archive to be stored in the block in which the another archive is stored is smaller than the size of the block.

6. A method for managing a storage comprising the steps of:
acquiring an archive associated with a first application;
storing the acquired archive in one or more of a plurality of blocks included in a flash memory; and
deleting one or more of the plurality of blocks, wherein, the storing includes storing the acquired archive in one or more of the blocks that does not store any archive associated with an application different from the first application, and,
when an application is deleted, the deleting includes deleting a block that stores an archive associated with the first application.

7. A non-transitory computer readable medium storing instructions that, when executed by one or more processors, cause a computing apparatus to perform a method that comprises:
acquiring means that acquires an archive associated with an application;
archive writing means that stores the acquired archive in one or more of a plurality of blocks included in a flash memory; and
block deleting means that deletes any of the plurality of blocks, wherein
the archive writing means stores the acquired archive in any of the blocks in which no archive associated with an application different from the application of the acquired archive is stored, and,
when an application is deleted, the block deleting means deletes a block in which an archive associated with the application to be deleted is stored
acquiring an archive associated with a first application;
storing the acquired archive in one or more of a plurality of blocks included in a flash memory; and
deleting one or more of the plurality of blocks, wherein, the storing includes storing the acquired archive in one or more of the blocks that does not store any archive associated with an application different from the first application, and,
when an application is deleted, the deleting includes deleting a block that stores an archive associated with the first application.

8. The method according to claim 6, further comprising deleting the block by deleting all archives stored in any of the plurality of blocks associated with the first application.

9. The method according to claim 6, wherein, when a size of the acquired archive is equal to or greater than a predetermined size, the method further comprises storing at least a part of the acquired archive in a block in which no other archive is stored.

10. The method according to claim 9, wherein the acquired archive belongs to either a first type or a second type, and
wherein the method further comprises storing a plurality of archives associated with the first application and belonging to the second type in a block in which only archives belonging to the second type are to be stored.

11. The method according to claim 9, wherein, when the size of the acquired archive exceeds a size of the block, the method further comprises:
dividing the acquired archive into a plurality of parts;
storing at least some of the plurality of parts in a first set of one or more blocks in which no other archive is stored; and
storing at least some of the plurality of parts, which is not stored in the first set of one or more blocks, in a block in which another archive is stored among the plurality of blocks, and
wherein a size of the part of the acquired archive to be stored in the block in which the another archive is stored is smaller than the size of the block.

12. The non-transitory computer readable medium of claim 7, the method further comprising deleting the block by deleting all archives stored in any of the plurality of blocks associated with the first application.

13. The non-transitory computer readable medium of claim 7, the method further comprising, when a size of the acquired archive is equal to or greater than a predetermined size, storing at least a part of the acquired archive in a block in which no other archive is stored.

14. The non-transitory computer readable medium of claim 13, wherein the acquired archive belongs to either a first type or a second type, and
wherein the method further comprises storing a plurality of archives associated with the first application and belonging to the second type in a block in which only archives belonging to the second type are to be stored.

15. The non-transitory computer readable medium of claim 13, when the size of the acquired archive exceeds a size of the block, the method further comprises:
dividing the acquired archive into a plurality of parts,
storing at least some of the plurality of parts in a first set of one or more blocks in which no other archive is stored; and
storing at least some of the plurality of parts, which is not stored in the first set of one or more blocks, in a block in which another archive is stored among the plurality of blocks, and
wherein a size of the part of the acquired archive to be stored in the block in which the another archive is stored is smaller than the size of the block.

* * * * *